United States Patent [19]

Leake et al.

[11] 4,424,291

[45] Jan. 3, 1984

[54] CORRUGATING ADHESIVE COMPOSITION AND PAPERBOARD PRODUCT PRODUCED THEREWITH

[75] Inventors: Craig H. Leake, Edison; Michael A. Silano, Somerset, both of N.J.

[73] Assignee: National Starch and Chemical Corporation, Bridgewater, N.J.

[21] Appl. No.: 291,193

[22] Filed: Aug. 10, 1981

Related U.S. Application Data

[63] Continuation-in-part of Ser. No. 215,289, Dec. 11, 1980, which is a continuation of Ser. No. 96,935, Nov. 23, 1979, abandoned.

[51] Int. Cl.$^3$ ............................ C08L 3/02; B32B 3/28
[52] U.S. Cl. .................................... 524/47; 156/328; 156/336
[58] Field of Search ................ 260/17.45 T; 156/328, 156/336, 205, 210; 524/47

[56] References Cited

U.S. PATENT DOCUMENTS

| | | | |
|---|---|---|---|
| 2,935,484 | 5/1960 | Arnold et al. | 260/17.4 |
| 2,996,462 | 8/1961 | Robbins | 260/17.4 |
| 3,015,572 | 1/1962 | Casey et al. | 156/210 |
| 4,157,318 | 6/1979 | Sadle et al. | 524/47 |

OTHER PUBLICATIONS

"Influence of Carrier Starch on Green Bond Strength in Corrugating Adhesives", R. H. Williams, C. H. Leake, and M. A. Silano, Tappi, vol. 60, No. 1, pp. 86–89.

*Primary Examiner*—John Kight, III
*Assistant Examiner*—Nathan M. Nutter
*Attorney, Agent, or Firm*—Edwin M. Szala; Ellen T. Dec

[57] ABSTRACT

A corrugating adhesive composition which exhibits superior tack performance is obtained by replacing, on a solids basis, from 5 to 100%, by weight, of the gelatinized starch carrier of a typical known starch-corrugating adhesive with a polymer containing at least 10%, by weight, of carboxyl groups derived from a polymerizable ethylenically unsaturated mono- or polycarboxylic acid or a mixture of these polymers.

6 Claims, No Drawings

CORRUGATING ADHESIVE COMPOSITION AND PAPERBOARD PRODUCT PRODUCED THEREWITH

BACKGROUND OF THE INVENTION

This application is a continuation-in-part of U.S. application Ser. No. 215,289 filed Dec. 11, 1980, which is a continuation of U.S. application Ser. No. 96,935 filed Nov. 23, 1979, now abandoned.

This invention relates to a corrugating adhesive composition and to a process for preparing corrugated paperboard using the adhesive composition and the corrugated paperboard product produced thereby.

As used herein the term "corrugated paperboard" refers to a fluted medium and a facing adhesively joined to the tips on one or both sides of the fluted medium.

The procedures employed in the production of corrugated paperboard normally involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is referred to as a single-faced board in that the facing is applied to only one surface thereof. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use and operation of corrugators in general are described in U.S. Pat. Nos. 2,102,937 and 2,051,025 to Bauer.

The particular adhesive employed in the corrugating process is selected on the basis of several factors, including the type of bond required in the final application of the finished corrugated product. Starch-based adhesives are most commonly used due to their desirable adhesive properties, low cost and ready availability.

The most fundamental of starch corrugating adhesives is that adhesive produced by gelatinizing starch in water with caustic soda to yield a primary mix of gelatinized carrier, which is then slowly added to a secondary mix of raw (ungelatinized) starch, borax, and water to produce the full-formulation adhesive. In the corrugating process the adhesive is applied to the tips of the fluted paper medium whereupon the heat causes the raw starch to swell and absorb water from the carrier starch. There are different theories regarding the respective roles of the raw starch and the carrier in the development of the adhesive properties, but there is substantial evidence to support the view that the carrier contributes to the bond strength and set speed of the adhesive, and that good tack in the carrier leads to good tack and therefore improved runnability in the full-formulation adhesive (see R. Williams, C. Leake, and M. Silano, TAPPI, Vol. 60, Nr. 4, April, 1977, pp. 86–89).

Most of the corrugating adhesive compositions in use today are alkaline in character. Under some conditions, however, it is desirable to employ non-alkaline adhesives; i.e., those adhesives which are acidic or neutral in pH, for corrugating purposes. For example, corrugated paperboard and boxes which are used only in the packaging of glass items must be constructed using an adhesive which is non-alkaline to prevent potential etching of the glass. Use of acidic adhesives is also imperative in the construction of fire-resistant paperboard treated with salts which would react with alkaline adhesives.

Nonetheless, there are certain inherent disadvantages associated with using typical acidic adhesive compositions in preparing corrugated paperboard. Thus, acidic corrugating adhesives, in general, have poor green bond strength (referred to herein as "tack"), which is the strength of the bond formed immediately when two surfaces are first brought together. In the corrugating process it is important that the adhesive possess good tack because the initial bond formed serves to hold the fluted medium and facing together to allow for greater speeds on the corrugator. The commercial bonding apparatus for continuously joining strips of paper to form corrugated paperboard is designed to operate at high speeds, for example, between 150 and 700 feet of paperboard per minute. Conventional acidic starch corrugating adhesives, which consist of raw and gelatinized starch, water and usually alum, (referred to hereinafter as simply acid starch adhesives) have a substantially higher gelatinization temperature than alkaline starch adhesives and thus take a longer time to gelatinize and to develop their adhesive properties. It has been generally believed in the prior art that the slow speed of the corrugator is due to the high gelatinization temperature of the raw starch. Acid starch adhesives are known in the art to have such poor tack that the corrugator speed attained is always lower than that achieved using an alkaline adhesive of identical viscosity and solids.

There are several acidic corrugating adhesives known which contain synthetic emulsion polymers, such as those described in U.S. Pat. Nos. 2,996,462; 4,018,959; 3,984,275; and 3,644,257, but synthetic solution polymers have not heretofore been employed for this purpose.

It is an object of the present invention to provide a corrugating adhesive containing a synthetic solution polymer which is characterized by its superior tack performance and speed on the corrugator.

It is another object to provide, in a preferred aspect of the invention, an acidic corrugating adhesive containing a synthetic polymer which shows improvement over known acid starch adhesives.

It is another object to provide a process for preparing corrugated paperboard using such an adhesive, which process allows for rapid speeds on the corrugator.

SUMMARY OF THE INVENTION

The above and related objects are achieved by replacing on a solids basis from 5 to 100%, by weight, of the gelatinized starch in the carrier portion of a starch-based corrugating adhesive composition with a homo- or copolymer which is substantially a polymer soluble in the adhesive medium, said polymer containing at least 10%, by weight, of carboxyl groups derived from a polymerizable ethylenically unsaturated mono- or polycarboxylic acid, or a mixture of such homo- or copolymers. In addition, the polymer must have a carrier wet tack value of at least about 0.03 lb./in. (5.4 g./cm.) as determined by the procedure described hereinafter.

Thus, a corrugating adhesive composition having improved tack and corrugator speed is obtained consisting essentially of:
1. a carrier consisting essentially of:
   a. 5-100%, by weight, of the polymer on a solids basis, and
   b. 0-95%, by weight, of gelatinized starch;
2. ungelatinized starch; and
3. water; wherein the carrier, ungelatinized starch and water are present in amounts of 1-15%, 9-35% and 60-90%, by weight, respectively, based on the total adhesive composition.

The adhesive composition of this invention may additionally contain 0.3-5.0%, by weight, based on adhesive solids, of a water-resistant thermosetting resin such as urea-formaldehyde or melamine-formaldehyde to impart water resistance to the bond formed thereby.

The preferred adhesive composition contains 2-10%, by weight, of the carrier, wherein the polymer comprises at least 50% of the carrier, 15-30%, by weight, of ungelatinized starch, and 70-80%, by weight, of water.

This invention further relates to a process for preparing corrugated paperboard by adhesively bonding a facing to a fluted paper strip comprising the steps of (a) applying the adhesive composition above described to the tips of the corrugations of a fluted paper strip and (b) pressing a facing onto the adhesive-coated tips of the fluted paper strip to form an adhesive bond.

By use of a synthetic polymer derived from a polymerizable ethylenically unsaturated mono- or polycarboxylic acid in the carrier portion of a corrugating adhesive, an adhesive is obtained having tack values superior to those of acid starch adhesives of the prior art. In fact, with use of a homopolymer such as polyacrylic acid, the tack performance of the adhesive of this invention is superior to that of known alkaline corrugating adhesives used commercially, resulting in increased corrugator speeds. The fact that incorporation of a synthetic polymer into the carrier increases the speed of the corrugator further supports the view that the tack of the carrier plays a very important role in the corrugating process. The results herein show that it is not necessarily the gelatinization temperature of the raw starch which determines corrugator speed, since the gelatinization temperature of the raw starch in acid starch adhesives and in those of the present invention are identical.

The process of this invention yields a corrugated paperboard product which may be used in preparing, for example, flame-retardant boxes, glass-containing boxes, mold-proof boxes wherein the mold-proofing agent is not compatible with alkaline adhesives, and in many other applications wherein use of a non-alkaline corrugating adhesive is necessary or desirable or wherein the pH of the adhesive is of no consequence.

DESCRIPTION OF THE PREFERRED EMBODIMENTS

The starch component which may be the ungelatinized starch or gelatinized carrier starch portion of the adhesive composition of this invention may be selected from any of the several starches, native or converted, heretofore employed in starch corrugating adhesive compositions. Suitable starches include, for example, those starches derived from corn, potato, waxy maize, rice, sago, tapioca, sorghum, wheat, as well as high amylose starches; i.e., starches which contain 30% or more by weight of amylose, and the various derivatives of these starches. Hence, among the applicable starches are included the various starch derivatives such as ethers, esters, thin-boiling types prepared by known processes such as mild acid treatments, oxidative, etc. and those derivatives of these starches which have high amylose contents. Preferred starches are those typically employed in corrugator adhesives of both the acid and alkaline type.

The starch content of the adhesive can vary considerably depending on several factors such as the intended application of the adhesive and the type of starch used. In the compositions of this invention, all or a major portion of the starch is employed in its ungelatinized, raw form in an amount of 9-35%, by weight, based on the total adhesive composition.

The remainder of the adhesive composition is composed of from 1 to 15%, by weight, of a carrier and from 60 to 90%, by weight, of water, such that all three components add up to 100% of the adhesive composition.

The carrier portion of the adhesive of this invention must contain from 5 to 100%, by weight, solids basis, of a synthetic polymer which is a homo- or copolymer derived at least in part from a polymerizable ethylenically unsaturated mono- or polycarboxylic acid. Mixtures of two or more of such polymers may also be utilized. The remaining 0 to 95% of the carrier is made up of a gelatinized starch, which may be any of the above-mentioned starches. In amounts of 5% of the carrier, or slightly higher, the synthetic polymer is, in effect, an additive which improves the green bond strength of the carrier. As the percentage of synthetic polymer in the carrier is increased, the tack performance of the adhesive improves, with the best tack values obtained when the polymer comprises 100% of the carrier. For economic purposes, however, the preferred maximum amount of polymer in the carrier is about 98%, and the most preferred amount is 50-95%, by weight, solids basis.

The synthetic polymer itself is substantially a solution polymer, i.e., a polymer which is soluble in the adhesive medium. Such a polymer may be an acid-soluble solution polymer or an alkali-soluble emulsion polymer which has been neutralized by adding a common base such as sodium hydroxide or ammonium hydroxide to form a solution polymer.

Representative of the polymerizable ethylenically unsaturated mono- or polycarboxylic acids included herein are acrylic, methacrylic, crotonic, itaconic, maleic and fumaric acids. Particularly preferred such monomers are acrylic and methacrylic acid.

The comonomers which may be used in conjunction with the above-named carboxylic acid monomers are any monomers which can copolymerize with the carboxylic acid monomers to form the copolymers as defined by this invention. Examples include vinyl compounds such as methyl vinyl ether, vinyl acetate, vinyl benzene and sulfonated vinyl benzene; esters of ethylenically unsaturated carboxylic acids such as esters of acrylic and methacrylic acids, half esters of fumaric, maleic and itaconic acids; and the like. The preferred comonomers herein are the acrylates and methacrylates; and particularly preferrred are butyl acrylate, ethyl acrylate, hydroxypropyl acrylate, hydroxypropyl methacrylate, and methyl methacrylate.

It is noted that the number of carboxyl groups in the polymer is one key factor in determining the tack performance of the final adhesive product. In general, the higher the percentage of carboxyl groups in the polymer, the higher the tack of the resultant adhesive, such that copolymerization of the carboxylic acid monomer with monomers which do not contain carboxyl groups detracts from the overall performance of the adhesive. In any event, the homo- or copolymer employed as or in the carrier must contain at least 10%, by weight, of carboxyl groups, in either free or neutralized form. Homopolymers are the preferred synthetic polymers herein, with the homopolymer of acrylic and methacrylic acid being particularly preferred.

The tack performance of the adhesive herein is another important factor in determining which polymers are suitable for the carrier. It has been found that for obtaining adhesives with good performance, the polymers employed in the present invention must have a carrier wet tack of at least about 0.03 lb./in. (5.4 g./cm.) as measured by the test procedure described herein. It is noted that this value for the wet tack is based on a carrier having 10% solids. The maximum tack valuable achievable will be determined by the maximum viscosity of the polymer, measured by the amount of workable solids which the adhesive can accomodate while still remaining in flowable form.

In preparing the above-described polymers, the practitioner may employ any of the conventional emulsion or solution polymerization techniques well known to those skilled in the art, depending on the amount of carboxyl groups present. In a typical preparation of the acid-soluble solution polymer, the monomers are polymerized in aqueous medium in the presence of a polymerization initiator such as potassium persulfate and an activator such as sodium thiosulfate at a temperature of 50° to 100° C.

The pH of the preferred adhesive herein is no greater than about 7, and usually no less than about 2. Lowering the pH below 2 does not improve the performance of the adhesive and may actually lead to some acid conversion of the starch. Raising the pH of the adhesive above 7 may represent an advantage with respect to increased corrugator speed, and may be desirable in lending certain properties to the adhesive such as a lower gelatinization temperature for the ungelatinized starch, a reduced tendency toward corrosion, and different penetration characteristics. However, the results obtained are usually not such as to warrant raising the pH above 7; and raising the pH may adversely affect the polymers of the present invention. Generally there is no need to adjust the pH of the adhesive during the corrugating operation.

The solids content of the adhesive, which is mainly starch and synthetic polymer, may vary considerably depending on such factors as, for example, the relative proportions of the ingredients incorporated therein, the molecular weight of the synthetic polymer employed, the particular starch employed, and the end use of the adhesive. A representative adhesive herein may have a solids content of, for example, about 15 to 35%, by weight, and preferably 20–30%, by weight, when no additives are employed. It will be recognized that use of optional additives as described below will increase the total solids content of the adhesive.

Depending on the ultimate application of the corrugating adhesive herein, it may be desirable to add a water-resistant thermosetting resin or a metal compound to the adhesive to enhance the water resistance thereof. Typical metal compounds include oxides or hydroxides of such metals as calcium, magnesium, zinc, lead, copper, aluminum, iron, and the like. When the thermosetting resin is incorporated into the adhesive, it must be present in an amount effective to impart the desired degree of water resistance to the adhesive bonds. Generally, this amount will range from 0.3 to 5.0%, by weight, based on adhesive solids. The resins which may be employed are those known in the art as additives for corrugating adhesives. Typical resins useful in this capacity include, for example, dimethylol ethylene urea, dimethylol methoxy ethyl carbamate, dimethylol hydroxyethyl triazone, dimethylol isobutyl carbamate, methylated methylolmelamine, melamine-formaldehyde and urea-formaldehyde. Many thermosetting resins are commercially available, typically as concentrated aqueous dispersions of the resin.

If desired, conventional non-chemically functional additives may be incorporated into the novel adhesive compositions of this invention to obtain specific results. Among these additives may be included preservatives; wetting agents; plasticizers; solubilizing agents; rheology modifiers; water conditioners; penetration control agents; peptizers such as urea; gelatinization temperature modifiers; inert fillers such as clay and finely ground polymers; thickeners such as inorganic colloidal clays, hydroxyethyl cellulose, polyvinyl alcohol, polymers of ethylene oxide and the like; and emulsions such as polyvinyl acetate.

In the preparation of the adhesive compositions of this invention, there are several different ways in which the ingredients can be added depending on such factors as the type and amount of synthetic polymer employed.

For example, the synthetic polymer may be added directly to the secondary mix of ungelatinized starch and water, followed by addition of the gelatinized carrier starch, if any, to obtain the adhesive. Alternatively, when gelatinized starch is part of the carrier, the synthetic polymer may be added to the starch solution prior to addition to the secondary mix (the term "starch solution" hereinafter refers to a dispersion of minute starch particles in water after the gelatinization process has occurred). In another variation, the starch can be added, either as a slurry of ungelatinized starch or as a starch solution, to the monomer(s) before polymerization thereof; the mixture is then polymerized in the usual manner to form the carrier, which is subsequently added to the secondary mix; i.e., the polymer is prepared in situ to form the carrier. It is noted that the emulsion polymer may be neutralized either before the carrier is added to the secondary mix or in the presence of ungelatinized starch. Any additives which may be desired such as thermosetting resins, thickeners, preservatives, etc. may be added to the secondary mix before or after addition of the carrier thereto. Ordinarily, the carrier is added slowly (over a period of about 25 min.) to the secondary mix followed by brief stirring of the combined mixture for, e.g., 10–20 min. to form the full-formulation adhesive.

The adhesive of this invention can be used to bond single- or double-faced boards using any equipment which is presently employed for the preparation of corrugated board. Thus, the adhesive is maintained at a temperature preferably between 25° and 43° C. before its application to the protruding tips of the fluted paper strip. The actual application may be accomplished by the use of glue rolls which are ordinarily employed in most corrugating machines, or one may, if desired, utilize other application methods which may be able to achieve a more economical distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

The following examples more fully illustrate the particular embodiments of this invention. In these examples all parts and percentages are given by weight and all temperatures in degrees Celsius unless otherwise noted. Furthermore, all Brookfield viscosities are measured using an RVF No. 2 spindle at 20 rpm. at 25° C., or at 41° C. if the carrier is 100% starch.

The following two test procedures were used to evaluate the tack of the carrier and the full-formulation adhesive:

CARRIER WET TACK TEST

The tack test is performed at 41° C. if the carrier is 100% starch and at 25° C. if the carrier contains any synthetic polymer or is 100% synthetic polymer.

A 1.5 mil. (0.038 mm.)-thick, 2 in. (5.1 cm.)-wide film of the carrier portion of the adhesive is drawn down with a Bird (trademark) applicator on a sheet of 50 lb. per ream (81.4 g./m.$^2$) wet strength bag paper. A second sheet of the same paper grade is placed on the wet adhesive film and the resultant laminate construction is rolled three times with a rubber-coated roller which weighs 7.425 kg. and is 8.9 cm. wide and 12.5 cm. in diameter. After five seconds from the time the second sheet is placed on the first, the two pieces of paper are peeled apart using an Instron (trademark) tensile tester having a head speed of 10 in./min. (25.4 cm./min.) downward pull. Tack values are recorded in lb./in. and g./cm. exactly one minute after peeling begins. It is understood that a cell is used on the Instron which will record numbers greater than the actual tack values recorded.

FULL-FORMULATION WET TACK TEST

A 15 mil. (0.38 mm.) film of the full-formulation corrugating adhesive is cast on a sheet of 50 lb. per ream (81.4 g./m.$^2$) wet strength bag paper with a Bird applicator to give a 6 in. (15.3 cm.)-wide film. A second sheet is placed on the wet adhesive film and then both sheets are set on a hot plate which is maintained at 177° C. The paper assembly is held in place with a metal plate which supplies a force of 0.1 lb./in.$^2$ (7 g./cm.$^2$). After an 8-second period on the hot plate the two pieces of paper are peeled apart using an Instron tensile tester as described above. Values are recorded in lb./in. and g./cm. one minute after peeling begins.

Both wet tack tests give predictions of the speed of the test material on the corrugator. Increasing tack values result in improved corrugator speed.

EXAMPLE I

This example illustrates the preparation of a corrugating adhesive in accordance with this invention.

Carrier

Polyacrylic acid, having a Brookfield viscosity of 3300 cps. at 10% solids, was prepared using standard solution polymerization techniques. A gelatinized starch was simultaneously prepared by adding 10 parts of a thin-boiling corn starch (water fluidity of 40) to 90 parts water and heating the resultant slurry at 83° C. for 20 min. A total of 2.6 parts of the starch solution (containing 0.26 parts solids) was added at 70°–83° C. to 0.9 parts of the 10% solution of polyacrylic acid (containing 0.09 parts solids) at 25° C. Upon analysis, the resultant test carrier representative of this invention was found to have a wet tack value at 10% solids of 0.24 lb./in. (41 g./cm.). As a comparision, a conventional adhesive carrier of the prior art, which was an alkaline corn starch prepared by cooking corn starch at 71° C. with 16% caustic on starch and post-adding 16% borax on starch, had a carrier wet tack value of 0.07 lb./in. (12 g./cm.) at 10% solids.

FULL-FORMULATION ADHESIVE

A secondary mix of starch was prepared by adding 24.7 parts ungelatinized corn starch to 71.8 parts water at a temperature of about 32° C. The secondary mix was agitated for 5 min., and 3.5 parts of the test carrier of this invention as described above was then added slowly over a period of about 20 min. The blend was agitated for an additional 10 min., with the resulting temperature being about 40° C.

A standard alkaline corn starch formulation was prepared by methods well known to those skilled in the art as a control. The properties of the full-formulation adhesive herein as compared to those of the control are given below:

| Carrier | Full-Formulation Solids (% by weight) | Full-Formulation Stein-Hall Cup Viscosity (sec.) | Full-Formulation Wet Tack (lb./in.) | (g./cm.) |
|---|---|---|---|---|
| Test | 23 | 38 | 0.94 | 167 |
| Control | 21 | 40 | 0.44 | 78 |

The test full-formulation adhesive of this invention was run on a corrugator single-face unit to produce a single-faced board. The A-fluted medium had a basis weight of 30 lb./1000 ft.$^2$ (148 g./m.$^2$), and the facing board had a basis weight of 62 lb./1000 ft.$^2$ (306 g./m.$^2$). Several samples of corrugated boards were each made at one of five varied machine speeds ranging from 50 to 420 ft. per min. (15 to 128 m./min.). Both the medium and the facing were passed over rolls heated to an average temperature of 177° C. In addition to being preheated in the aforementioned manner, the medium was impinged with steam to facilitate fluting. The corrugator ran successfully at 420 feet per min. (fpm.), equivalent to 128 meters per min. (mpm.), indicating that the adhesive had good bond strength.

EXAMPLE II

This example illustrates the effect of concentration of polyacrylic acid on the wet tack of various carriers for the adhesive composition of this invention.

The carriers designated as 1-9 in Table I were prepared as described in Example I using the indicated relative amounts of starch and polyacrylic acid on a solids basis. In Carrier 1 waxy maize starch was employed, while in Carriers 2-9 corn starch was utilized. The Brookfield viscosity and wet tack values of each carrier at 10% solids are indicated in Table I.

TABLE I

| Carrier | Amount of starch (parts) | Amount of polyacrylic acid (parts) | Brookfield Viscosity (cps.) | Carrier Wet Tack (lb./in.) | (g./cm.) |
|---|---|---|---|---|---|
| 1* | 100 | 0 | 10,000 | 0.01 | 1.8 |
| 2* | 100 | 0 | 15,000 | 0.02 | 2.7 |
| 3 | 95 | 5 | 25,750 | 0.03 | 5.5 |
| 4 | 90 | 10 | 30,000 | 0.06 | 11.0 |
| 5 | 85 | 15 | 28,750 | 0.10 | 17.8 |
| 6 | 75 | 25 | 25,250 | 0.23 | 41.2 |
| 7 | 10 | 90 | 27,000 | 0.69 | 120.8 |
| 8 | 5 | 95 | 26,750 | 0.71 | 126.4 |

TABLE I-continued

| Carrier | Amount of starch (parts) | Amount of polyacrylic acid (parts) | Brookfield Viscosity (cps.) | Carrier Wet Tack (lb./in.) | (g./cm.) |
|---|---|---|---|---|---|
| 9 | 0 | 100 | 26,250 | 0.73 | 129.2 |

*These examples are included for comparative purposes.

The above results indicate that increasing amounts of polyacrylic acid in the carrier yield correspondingly higher tack values and that significant tack values are obtained when polyacrylic acid is present in amounts of 5-100%, by weight, of the carrier. When incorporated into a full-formulation adhesive, these carriers, due to their high tack values, are expected to strengthen the green bond of the adhesive and allow the corrugator to be run at higher speeds.

EXAMPLE III

This example illustrates a different preparation of the carrier.

Carrier Type A

Ungelatinized thin-boiling corn starch having a water fluidity of 40 was added to acrylic acid monomer and the resulting mixture was solution-polymerized by the usual procedures to produce a carrier at 15.5% solids containing gelatinized starch and polyacrylic acid in a 50/50 solids ratio.

Carrier Type B

The procedure above was repeated except that a carrier at 12.1% solids containing starch and polyacrylic acid in a 33/67 solids ratio was prepared.

Each type of carrier was diluted to 10% solids and evaluated for wet tack. The results are given in Table II.

TABLE II

| Carrier Type | Brookfield Viscosity (cps.) | Carrier Wet Tack (lb./in.) | (g./cm.) |
|---|---|---|---|
| A | 8,800 | 0.225 | 40 |
| B | 6,600 | 0.373 | 66 |

EXAMPLE IV

This example illustrates carriers for the corrugating adhesives of this invention containing polymethacrylic acid and copolymers of acrylic and/or methacrylic acid.

Various homo- and copolymers were prepared by standard solution polymerization procedures. The solids content, viscosity and wet tack of each are indicated in Table III.

TABLE III

| Polymer | Solids (% by weight) | Brookfield Viscosity (cps.) | Carrier Wet Tack (lb./in.) | (g./cm.) |
|---|---|---|---|---|
| Polymethacrylic acid | 10.0 | 2,300 | 0.45 | 79 |
| Physical blend of methacrylic and polyacrylic acids (50:50 weight ratio) | 10.0 | 13,250 | 0.80 | 143 |
| Copolymer of methacrylic and polyacrylic acids (50:50 weight ratio) | 10.0 | 3,700 | 0.12 | 21 |

TABLE III-continued

| Polymer | Solids (% by weight) | Brookfield Viscosity (cps.) | Carrier Wet Tack (lb./in.) | Carrier Wet Tack (g./cm.) |
|---|---|---|---|---|
| Copolymer of methacrylic acid and ethyl acrylate (93:7 weight ratio) | 12.5 | 12,000 | 0.22 | 38 |
| Copolymer or acrylic acid and 2-hydroxyethyl methacrylate (90:10 weight ratio) | 10.0 | 6,400 | 0.59 | 105 |
| Copolymer of acrylic acid and 2-hydroxypropyl acrylate (90:10 weight ratio) | 9.4 | 4,200 | 0.35 | 62 |
| Copolymer of acrylic acid and 2-hydroxypropyl acrylate (80:20 weight ratio) | 10.6 | 8,900 | 0.40 | 71 |

The results indicate that various copolymers may be employed and that a physical mixture of polyacrylic acid and polymethacrylic acid is also effective as a carrier for the corrugating adhesives of this invention.

EXAMPLE V (comparative)

This example illustrates that polymers without carboxyl groups are not effective carriers herein.

The polymers designated in Table IV were obtained commercially from the indicated manufacturer and have the given Brookfield viscosity and carrier wet tack value at 10% solids.

TABLE IV

| Polymer | Brookfield Viscosity (cps.) | Carrier Wet Tack (lb./in.) | Carrier Wet Tack (g./cm.) |
|---|---|---|---|
| Natrosol JR (trademark for hydroxyethyl cellulose manufactured by Hercules, Inc.) | 3,050 | 0.020 | 3.6 |
| Natrosol KR (trademark for hydroxyethyl cellulose manufactured by Hercules, Inc.) | >200,000 | 0.005 | 0.9 |
| Polyox WSR N-3000 (trademark for polyethylene oxide manufactured by Union Carbide) | 55,000 | 0.010 | 1.8 |
| Gantrez PVP K90 (trademark for polyvinyl pyrrolidone manufactured by GAF Corp.) | 180 | 0.002 | 0.4 |
| Gelvatol I-90 (trademark for polyvinyl alcohol manufactured by Monsanto Co.) | 2,500 | 0.020 | 3.6 |

A Natrosol polymer (hydroxyethyl cellulose) having carrier wet tack below 0.020 lb./in. was incorporated into a full-formulation adhesive which was found to give a maximum corrugator speed of only 250 fpm. when tested on the corrugator.

The results indicate that a corrugating adhesive composition containing as carrier 100% of a synthetic polymer which does not contain carboxyl groups results in reduced corrugator speed due to its low tack, as compared with a corrugating adhesive of this invention containing a polymer at the same percent solids but containing at least 10%, by weight, of carboxyl groups.

EXAMPLE VI (COMPARATIVE)

In this example a copolymer derived from 5% methacrylic acid, 47.5% butyl acrylate and 47.5% methyl methacrylate was prepared by standard emulsion polymerization techniques and thereafter solubilized by the addition of sodium hydroxide. This copolymer, which contains 5%, by weight, of carboxyl groups, had a carrier wet tack value below 0.03 lb./in. When incorporated into a full-formulation adhesive as described in this invention, the copolymer solution had insufficient viscosity to function successfully as a carrier.

EXAMPLE VII (COMPARATIVE)

In this example a solution copolymer was prepared derived from 67.5% polyacrylic acid as its sodium salt and 32.5% hydroxypropyl acrylate. This copolymer, containing 67.5%, by weight, of carboxyl groups and having a carrier wet tack value below 0.03 lb./in., could not be run on the corrugator if formulated under the conditions described in this invention, due to its low viscosity. As an approximate comparison, a full-formulation adhesive was prepared containing more than 15% of the copolymer as carrier, using the following amounts of components:

4310 g. copolymer (50% solids)
862 g. ungelatinized starch
300 g. water

The resultant formulation, which had a Stein-Hall viscosity of 120 sec. and a Brookfield viscosity of 1220 cps., was run on a laboratory corrugator to prepare single-faced board as described in Example I. At 50 fpm. (15 mpm.), a board was successfully prepared, but between 50 fpm. and 150 fpm. the lamination of facing to fluted medium failed.

It can be seen from the results of Examples VI and VII that unless the amount of carboxyl groups in the polymer is at least 10%, by weight, and unless the carrier wet tack of the polymer is at least about 0.03 lb./in., a satisfactory corrugating adhesive, in terms of machine speed, will not be obtained.

EXAMPLE VIII

The full-formulation corrugating adhesives designated Formulae I-VI in Table V were prepared as follows:

The polyacrylic acid employed in each carrier was produced by standard solution polymerization techniques, and the starch solutions were prepared as described in Example I. In Formulae II-VI, the starch solution and the polyacrylic acid solution, both at 10% solids, were combined as described in Example I in sufficient amounts to give the indicated amounts of solids in the formulations. The full-formulation adhesives were prepared by adding the carrier to the indicated amount of ungelatinized starch dispersed in the given amount of water. The ingredients, proportions, ployed. The results are indicated in Table VI, with the highest values representing the best results.

TABLE VI

| Corrugator speed | | Dry Pin Adhesion Value (lb. per 24 in. of glue line) | | | | | Acid Control | Alkaline Control |
|---|---|---|---|---|---|---|---|---|
| | | Formula | | | | | | |
| (fpm.) | (mpm.) | I | II | III | IV | V | | |
| 50 | 15 | 113 | 144 | 176 | 152 | 179 | 90 | 89 |
| 150 | 46 | 148 | 170 | 150 | 217 | 183 | 105 | 84 |
| 250 | 76 | 104 | 161 | 165 | 210 | 155 | 120 | 102 |
| 350 | 107 | 86 | * | 136 | 129 | 116 | no bond | 81 |
| 450 | 137 | 78 | * | 99 | 78 | 80 | no bond | 83 |

*No data available.

and viscosities of each carrier are listed in Table V.

TABLE V

| | Formula | | | | | |
|---|---|---|---|---|---|---|
| | I | II | III | IV | V | VI |
| Ingredients (parts): | | | | | | |
| Polyacrylic acid solution, solids basis | 3.4 | 1.7 | 0.8 | 1.1 | 1.1 | 1.1 |
| Corn starch solution, solids basis | — | 1.7 | — | — | 2.2 | 2.2 |
| High amylose starch solution, solids basis | — | — | 2.9 | 2.2 | — | — |
| Ungelatinized corn starch | 20.5 | 20.5 | 25.1 | 25.1 | 25.1 | 25.1 |
| Water | 76.1 | 76.1 | 71.2 | 71.6 | 71.6 | 71.6 |
| Urea-formaldehyde | 0 | 0 | 0 | 0 | 0 | 0.3 |
| Properties: | | | | | | |
| Brookfield viscosity (cps.) | 1118 | 560 | 1900 | 275 | 370 | 420 |
| Stein-Hall viscosity (sec.) | 65 | 49 | 54 | 29 | 51 | * |

*Not Determined

Each of the formulations above was run on a laboratory corrugator to prepare single-faced board as described in Example I. Upon completion of the corrugating operations, the resultant corrugated boards bonded with Formulae I–V were tested as described below:

Pin Adhesion Testing

Duplicate 2×4 in. (5.1×10.2 cm) samples of each of the boards obtained at each of five varied machine speeds were cut and thereafter subjected to the dry pin adhesion test described in TAPPI Standard UM 802 (formerly R 337), using a conventional testing apparatus obtainable from Testing Machines Inc., Mineola, Long Island, N.Y. The test results were recorded in terms of lb. (per 24 in. of glue line) required to separate completely the fluted medium from the facing. As an acid control, an acid starch adhesive consisting of 4.4% corn starch solution, 25.2% ungelatinized starch and 70.4% water was prepared. As an alkaline control, a standard commercial corn starch corrugating adhesive was em-

EXAMPLE IX

This example illustrates the use of alkali-soluble copolymers as carriers in the invention herein.

Each copolymer A–D in Table VII was prepared by standard emulsion polymerization techniques and thereafter solubilized by addition of sodium hydroxide to equal neutralization levels. Evaluation for viscosity and wet tack at 10% solids of each copolymer was then carried out, with the results indicated in Table VII.

TABLE VII

| Copolymer | Copolymer Components in Amounts (in weight ratio) | Brookfield Viscosity (cps.) | Carrier Wet Tack | |
|---|---|---|---|---|
| | | | (lb./in.) | (g./cm.) |
| A | Methacrylic acid and butyl acrylate (50:50) | 1,825 | 0.17 | 29 |
| B | Methacrylic acid butyl acrylate and methyl methacrylate (50:30:20) | 7,750 | 0.24 | 42 |
| C | Methacrylic acid, ethyl acrylate and methyl methacrylate (25:37.5:37.5) | 50,000 | 0.14 | 24 |
| D | Methacrylic acid, butyl acrylate and methyl methacrylate (59:41.7:8.3) | 5,600 | 0.24 | 43 |

The results indicate that several copolymers are effective as carriers herein.

EXAMPLE X

This example illustrates the use of an alkali-soluble copolymer in a full-formulation corrugating adhesive herein.

Copolymer D of Example IX, which was solubilized with the indicated amount of sodium hydroxide, was employed in a full-formulation adhesive by adding it as a solution of 15% solids to the indicated amount of ungelatinized starch dispersed in the given amount of water.

| Ingredients | Amounts (parts by weight) |
|---|---|
| Copolymer D, solids basis | 312 |
| Sodium hydroxide | 36.2 |
| Ungelatinized corn starch | 1755 |
| Water | 4728 |

The resultant formulation was run on a laboratory corrugator to prepare single-faced board as described above. Upon completion of the corrugating operation the resultant board was tested for pin adhesion as described in Example VIII. The results, given in Table VIII, indicate that the alkali-soluble carrier produces a fully acceptable corrugated board.

TABLE VIII

| Corrugator speed | | Dry Pin Adhesion Value |
|---|---|---|
| (fpm.) | (mpm.) | (lb. per 24 in. of glue line) |
| 50 | 15 | 72 |
| 150 | 46 | 104 |
| 250 | 76 | 118 |
| 350 | 107 | 120 |
| 450 | 137 | 113 |

Summarizing, this invention is seen to provide a corrugating adhesive containing a synthetic polymer derived from selected carboxylic acids as at least a portion of the carrier thereof which adhesive is characterized by its superior tack performance. This invention also provides a process for preparing corrugated paperboard therewith.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. A corrugating adhesive composition consisting essentially of:
   1. a carrier consisting essentially of:
      a. about 5-98%, by weight, on a solids basis, of a polymer which is substantially a polymer soluble in the adhesive medium, said polymer containing at least 10%, by weight, of carboxyl groups derived from a polymerizable ethylenically unsaturated mono- or polycarboxylic acid, or a mixture of said polymers, said polymer having a carrier wet tack of at least about 0.03 lb./in., and
      b. about 2-95%, by weight, of gelatinized starch;
   2. ungelatinized starch; and
   3. water; wherein said carrier, ungelatinized starch and water are present in amounts of 1-15%, 9-35% and 60-90%, by weight, respectively, based on the total adhesive composition.

2. The adhesive of claim 1 wherein said polymer is a polymer of acrylic or methacrylic acid.

3. The adhesive of claim 1 wherein said polymer is an acid-soluble polymer.

4. The adhesive of claim 1 wherein said polymer is an alkali-soluble polymer.

5. The adhesive of claim 1 wherein the amount of said polymer in said carrier is 50-95% by weight.

6. The adhesive of claim 1 which contains 2-10%, by weight, of said carrier, 15-30%, by weight, of said ungelatinized starch and 70-80%, by weight, of said water, based on the total adhesive composition.

* * * * *